UNITED STATES PATENT OFFICE.

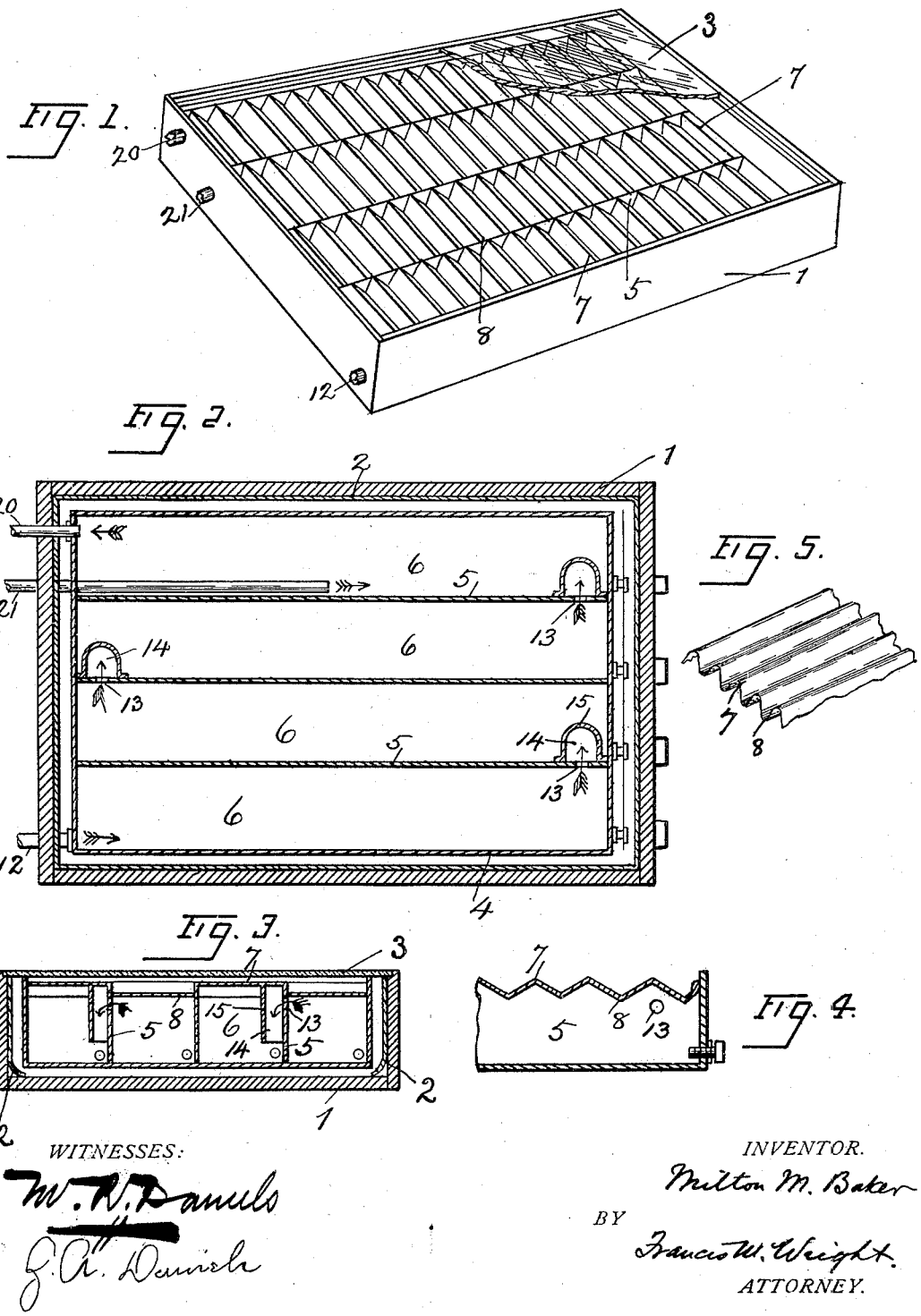

MILTON M. BAKER, OF STOCKTON, CALIFORNIA, ASSIGNOR TO THE SUNSHINE WATER HEATER CO., OF SAN FRANCISCO, CALIFORNIA, A CORPORATION OF CALIFORNIA.

SOLAR WATER-HEATER.

SPECIFICATION forming part of Letters Patent No. 695,136, dated March 11, 1902.

Application filed November 12, 1900. Serial No. 36,292. (No model.)

*To all whom it may concern:*

Be it known that I, MILTON M. BAKER, a citizen of the United States, residing at Stockton, in the county of San Joaquin and State of California, have invented certain new and useful Improvements in Solar Water-Heaters, of which the following is a specification.

My invention relates to improvements in solar water-heaters, the object of my invention being to provide an apparatus of this character which shall be simple and economical in construction, which shall be adapted to present a large heat-absorbent surface to the rays of the sun even when the sun is comparatively low down on the meridian— that is, at a considerable period either before or after midday—and which shall be so constructed that the abstraction of a quantity of hot water shall not materially reduce the temperature of that body of water in the reservoir which would next be drawn off.

My invention therefore resides in the novel construction, combination, and arrangement of parts for the above ends hereinafter fully specified, and particularly pointed out in the claims.

In the accompanying drawings, Figure 1 is a perspective view of the solar water-heater. Fig. 2 is a section of the same, taken between the top and bottom thereof. Fig. 3 is a transverse section on the line A A of Fig. 2. Fig. 4 is a section on the line B B of Fig. 2, and Fig. 5 is a perspective view of a modified form of the top of the water-reservoir.

Referring to the drawings, 1 represents a box which is adapted to be placed in or upon the top of the roof of a house, so as to present its sloping upper surface to the south, and thus obtain the maximum heating effect of the solar rays. The sides of the box are provided with reflectors 2, and the box has a glass top 3. Said top closes the box, forming an air-tight chamber. In said box is a reservoir 4, divided by partitions 5 into chambers 6. The top of said reservoir is formed of metal crimped or corrugated, so that the ridges 7 of the corrugations are directed upwardly and transversely of the reservoir. The corrugations of the respective chambers alternate with each other, so that the ridges of one corrugation come in line with a depression 8 of the corrugated top of the adjoining chamber. Cold water is admitted by an inlet-pipe 12 into the lowest chamber, and as it becomes heated by absorption of the heat of the solar rays passing through the glass top of the box the heated water rises to the top of said chamber and, when permitted to do so, escapes into the next chamber by an aperture 13 near the top of the partition between them and at one end of said partition. A conduit 14 is formed by securing a piece 15 of bent metal against said partition over against said aperture, said conduit extending to a point near the bottom of the partition, so that the water passing through said aperture is compelled to descend to the bottom of the chamber into which it enters. To escape from said chamber into the next chamber, the water must then pass to the other end of the chamber and ascend and pass out through a similar aperture 13 at the top of the next partition and at said other end, whence it is compelled to pass down by means of another conduit 14. The water is thus conducted through the series of chambers by being passed to alternate ends of the reservoir, in each case being conducted to the bottom of the chamber into which it enters. By reason of this construction the water in each chamber is hotter than the one immediately below it, and the water in the upper chamber is much hotter than that in the lower chambers. The consequence is that when the water is drawn off from the uppermost chamber, which is done through the outlet-pipe 20, water is admitted into said uppermost chamber only from the chamber immediately below it, and only the hottest portion of said water—namely, that lying close to the surface—is so admitted, so that the effect of drawing off a quantity of water is to reduce the temperature of the uppermost chamber very little, the cold water having to pass into the lowest chamber and to be heated therein by its passage through successive chambers.

21 is the return end of the circulating-pipe, which commences at the outlet 20 and goes to the faucets of the house and returns to the lowest point of the uppermost chamber at 21 to form a circulating system, including an auxiliary heater. This part of the invention, however, forms part of a separate application filed by me December 15, 1899, Serial No. 740,459.

In Fig. 5 I have shown a modified form of the top of the reservoir. The corrugations of the top of the reservoir not only provide a large absorbent surface for the heat rays, but they cause said heat rays to impinge upon an absorbent surface almost at a right angle even when the sun is considerably distant from its midday position. The sloping surfaces of one side of the corrugations catch the rays of the sun in the morning and those on the other side in the evening. It is of importance that the solar rays should strike the heat-absorbent surface as directly as possible, so that as small a proportion as possible of said heat may be reflected. By corrugating the top of the reservoir in a direction through the meridian at the place where the heater is used I obtain the above result.

I claim—

1. In a solar water-heater, the water-receptacle described formed entirely of metal and having inner, outer and side walls, and also having a plurality of partitions whereby it is divided into chambers, conduits, each of which extends from one chamber at a point adjacent to the outer wall of the same into the adjacent chamber at a point adjacent the inner wall thereof; said conduit being arranged alternately adjacent the opposite ends of the receptacle, a water-supply pipe connected to one of the outer chambers, and a water-discharge pipe connected to the other outer chamber, substantially as described.

2. In a solar water-heater, the water-receptacle described formed entirely of metal and having the inner and side walls and outer crimped walls and also having partitions whereby it is divided into chambers, conduits, each of which is connected to a partition and extends from an aperture therein communicating with one chamber at a point adjacent to the outer wall of the same and an adjacent chamber at a point adjacent to the inner wall thereof, said conduits being arranged alternately adjacent to opposite ends of the receptacle, a water-supply pipe connected to one of the outer chambers, and a water-discharge pipe connected to the other outer chamber, substantially as described.

3. In a solar water-heater, the confined air-chamber having a glass face, and the water-receptacle arranged in the air-chamber and formed entirely of metal and having inner and side walls and corrugated or crimped outer walls, and also having a plurality of partitions whereby it is divided into chambers, conduits, each of which extends from one chamber at a point adjacent to the outer wall of the same to an adjacent chamber at a point adjacent to the inner wall thereof; said conduits being arranged alternately adjacent to the opposite ends of the receptacle, a water-supply pipe connected to one of the outer chambers and a water-discharge pipe connected to the other chamber, substantially as described.

4. A heater comprising a receptacle having an absorption-plate, a plurality of partitions within the receptacle and dividing it into chambers, a perforation in each partition adjacent its upper edge and lying alternately at opposite ends of the receptacle, and a plate secured on one side of each partition, said plates having their edges secured to the partition excepting at their lower ends and separated from the partitions within their edges to form liquid-passages from the perforations to the bottom of the chamber, substantially as described.

5. A heater comprising a receptacle having an absorption-plate, a plurality of partitions within the receptacle and dividing it into chambers, a perforation in each partition adjacent its upper edge and lying alternately at opposite ends of the receptacle, and a conduit leading from each perforation to conduct the liquid from the top of one chamber at its end to near the bottom and at the same end of the adjacent chamber, substantially as described.

In witness whereof I have hereunto set my hand in the presence of two subscribing witnesses.

MILTON M. BAKER.

Witnesses:
FRANCIS M. WRIGHT,
Z. A. DANIELS.